United States Patent
Bertran Serra et al.

(10) Patent No.: US 6,768,574 B2
(45) Date of Patent: Jul. 27, 2004

(54) ELECTROCHROMIC DEVICE AND CORRESPONDING USES

(75) Inventors: Enric Bertran Serra, Corbera de Llobregat (ES); Carles Person Millaruelo, Barcelona (ES); Isidre Porqueras Orea, Tarragona (ES); Gregorio Viera Marmol, Barcelona (ES)

(73) Assignee: Ficosa North America Corporation, Madison Heights, MI (US)

( * ) Notice: Subject to any disclaimer, the term of this patent is extended or adjusted under 35 U.S.C. 154(b) by 0 days.

(21) Appl. No.: 10/337,980

(22) Filed: Jan. 6, 2003

(65) Prior Publication Data

US 2003/0156313 A1 Aug. 21, 2003

Related U.S. Application Data

(63) Continuation-in-part of application No. PCT/ES01/00266, filed on Jul. 5, 2001.

(30) Foreign Application Priority Data

Jul. 7, 2000 (ES) .......................................... 200001688

(51) Int. Cl.⁷ ............................. G02F 1/15; G02F 1/153
(52) U.S. Cl. ....................................... 359/265; 359/273
(58) Field of Search ................................ 359/265, 266, 359/267, 269, 270, 273, 275

(56) References Cited

U.S. PATENT DOCUMENTS

| | | | |
|---|---|---|---|
| 5,673,150 A | 9/1997 | Ono et al. | 359/603 |
| 5,724,187 A | 3/1998 | Varaprasad et al. | 359/608 |
| 5,822,107 A | 10/1998 | Lefrou et al. | 359/273 |
| 6,208,452 B1 | 3/2001 | Nishikitani et al. | 359/270 |
| 6,426,827 B1 * | 7/2002 | Bonhote et al. | 359/265 |

FOREIGN PATENT DOCUMENTS

| | | |
|---|---|---|
| EP | 0682284 | 11/1995 |
| JP | 0047265 | 2/2000 |

* cited by examiner

*Primary Examiner*—Tim Thompson
(74) *Attorney, Agent, or Firm*—Jones Day

(57) ABSTRACT

The invention discloses an electrochromic device of the type comprising at least one substrate and a structure of at least partly superimposed layers, where the structure comprises at least one layer of electrochromic material and a layer of electronic insulating transparent ion-conducting solid electrolytic material, and where at least one of these layers is nanostructured, i.e. has a nanostructure. Possible uses of these electrochromic devices are for controlling the energy of the electromagnetic waves reflected by the device or transmitted through the device, for example, a rear-view mirror or a motor vehicle window glass.

18 Claims, 1 Drawing Sheet

ELECTROCHROMIC DEVICE AND CORRESPONDING USES

This application is a continuation-in-part of co-pending PCT Application No. PCT/ES01/00266 filed Jul. 5, 2001, published in Spanish under PCT Article 21(2), which claims priority to Spanish Patent Application No. 200001688 filed Jul. 7, 2000.

FIELD OF THE INVENTION

The invention relates to an electrochromic device of the type comprising at least one substrate and a structure of at least partly superimposed layers, where the structure comprises at least one layer of electrochromic material and a layer of electronic insulating transparent ion-conducting solid electrolytic material, as well as to uses of such electrochromic devices.

BACKGROUND OF THE INVENTION

Devices of this type allowing the passage of electromagnetic radiation, particularly the passage of visible light, to be regulated by varying an electric potential difference are known. This variation of the potential difference causes the layer of electrochromic material to vary the transmittance thereof.

One possible use for these devices is in rear-view mirrors for motor vehicles. Under certain circumstances, for example when driving at night, the light reflected by the rear-view mirrors can dazzle the driver. Therefore, various devices have been designed which, based on the electrochromic effect that certain materials have, allow the transmittance of one or more of the layers forming the mirror to be regulated, so as thereby to reduce the amount of reflected light and avoid dazzling.

Various factors are involved in the design of an electrochromic device and, in certain cases, they have opposite effects. A conventional electrochromic device, for example a rear-view mirror, usually comprises a glass substrate on which there are deposited a layer forming a transparent electrode, a layer of electrochromic material, a layer of electrolytic material, a layer of another electrochromic material complementary to the first layer (i.e., which reacts to the electric polarity in the opposite direction to the first layer, in such a way that both layers vary their transmittance in the same direction, usually also called a contraelectrochromic material) and a layer forming a reflective metallic electrode. A second glass substrate usually seals the ensemble. Both the materials and the thicknesses of the layers have a great influence on parameters such as the transmittance of the ensemble, the transmittance variation of the ensemble, the response rate of the ensemble to the application of a particular voltage, etc. Obviously, it is of general interest to have a high maximum transmittance, a lowest possible minimum transmittance, and the fastest possible response rate. In the particular case of the use of electrochromic devices to rear-view mirrors, all these properties are extremely important. Dazzling is caused by a very great difference of light intensity, whereby the transmittance of the electrochromic layers of the rear-view mirror must be greatly varied to counteract this light intensity difference and, also, it must be done at high speed, since otherwise dazzling has already taken place. Nevertheless, all the layers of the device must have a high transmittance so that the mirror will not have a dark appearance during daylight driving.

SUMMARY OF THE INVENTION

It is an object of the invention to overcome these drawbacks. This aim is achieved by an electrochromic device of the type first mentioned above, wherein at least one of said layers is nanostructured, i.e., has a nanostructure.

In general, a nanostructured material is a material which: a) has a structure with a crystalline order of nanometric range (with domains in the range of 2–20 nm); or, b) having crystalline domains of nanometric dimensions (1–20 nm) embedded in an amorphous matrix, of the same or a different compound; or, c) having a structure formed by multiple layers of nanometric thickness (2–100 nm), alternating between two different materials or alternate layers of the same material but with a different structure (for example, combination of amorphous and nanocrystalline), different degree of oxidation and/or different stoichiometry.

This nanostructure has a great influence on various physical properties of the material. Thus, a nanostructured layer has improved conductivity properties relative to a conventional layer. Likewise, a nanostructured layer of electrochromic material has a greater ion storage capacity, as a result of the increase in the number of interfaces and of the structural disorder. The physical and chemical properties related to the new structure (ion transport—entrainment and diffusion—, optical absorption, device switching speed) may be optimized, in accordance with the design of the layer structure and the materials used, to increase the features of the electrochromic device.

All of this allows thinner layers to be made and a faster switching speed to be achieved.

The electrochromic material is preferably a material selected from the group formed by transition metal oxides and combinations of at least two of these. Particularly, the transition metal oxides are, for example, wolfram oxide, molybdenum oxide, vanadium oxide, titanium oxide, chromium oxide, iridium oxide or niobium oxide, among the most common transition metal oxides which may have transitions between different states of oxidation (with valence change), associated or not with changes in the coloring of the oxide (from transparent to colored and vice versa, or always transparent).

The layer of electronic insulating transparent ion-conducting solid electrolytic material is preferably a layer of an electronic insulating material having a resistivity above $10^9$ Ω·m (measured as conventional non-nanostructured material) and having a high optical transmittance associated with a low extinction coefficient, k<10-2, in the visible range (400 nm to 800 nm). The extinction coefficient is related to the absorption coefficient by the following formula (1):

$$\alpha = 4\pi k/\lambda \qquad (1)$$

and the transmittance is related to the absorption coefficient by Lambert's law (2):

$$T(\text{in units}) = I/I_o = e^{-\alpha d} \qquad (2)$$

These electrolytic materials are advantageously selected from the group formed by oxides, nitrides, oxinitrides and carbides of silicon, fluorides, oxides and nitrides of semimetals, and combinations of at least two of the foregoing. Particularly, they are metals of the group formed, for example, by the binary compounds $SiO_2$, $SiO$, $SiC$, $Ta_2O_5$, $Al_2O_3$, $Si_3N_4$, $Y_2O_3$, $MgF_2$, $Zr_3O_2$, the ternary compounds $LiAlF_4$, $LiNbO_5$ and combinations of at least two of any of the foregoing compounds. These materials are those which, among the most common transparent electronic insulating (dielectric) materials, have most appropriate ion transport properties for their application to an electrochromic device.

A preferred embodiment of the invention is obtained when the superimposed layer structure comprises a first layer which is an electrode, being a conductive metal or a transparent conductive oxide, a second layer which is an electrochromic material, a third layer which is an electronic insulating transparent ion-conducting solid electrolytic material, a fourth layer which is also an electrochromic material, with the electrochromic material of the fourth layer being complementary to the electrochromic material of the second layer and a fifth layer which is an electrode, being a conductive metal or a transparent conductive oxide. If one of the layers forming an electrode is a reflective layer, or if an initial or final reflective layer is added to the device, this may, for example, be applied to the manufacture of mirrors, for example, rear-view mirrors for vehicles. Alternative, other articles may be manufactured, such as window glasses for vehicles having a variable transmittance either over the whole glass or in an area thereof. Generally speaking, it is possible to control the electromagnetic energy reflected by said device or transmitted through said device.

Each of the nanostructured layers may be a single layer or may, in turn, be formed by a number of nanolayers (sub-layers of nanometric thickness), which may be made from different materials, or of the same material but applied or deposited under different conditions. In this way, the properties of each of the nanolayers may be combined. For example, one advantage of a layer of electrolytic material formed by nanolayers is that the electronic barriers are increased, while the total thickness of the layer may be reduced, whereby the switching speed of the device may be increased, since the distance that the ions have to cover between both electrochromic layers is reduced. A layer of electrochromic material having nanolayers has a more pronounced nanostructure, thereby increasing the number of grain boundaries or the interfaces between crystalline domains inside the nanolayers, whereby the chemical instability of the material is increased by increasing the defects in the boundaries and at the ion exchange sites. On the other hand, the nanolayers allow the level of tensions generated due to: 1) the different thermal expansion of the adjacent layers during the deposition process; 2) the sputtering with atomic oxygen or argon ions during the deposition process (this sputtering is part of the manufacturing process of the nanostructured layer, as will be seen hereinafter); 3) the expansion of the layers associated with the electrochemical process of insertion of ions in the structure, and/or 4) the expansion of the layers caused during the ion exchange process between the electrochromic layers, in an operative cycle of the electrochromic device.

The thickness of said nanolayers is preferably comprised in the range of 2 to 20 nm, and the total thickness of each of the nanostructured layers is preferably comprised in the range of 100 to 400 nm.

An interface layer having a thickness ranging from 0.5 to 10 nm is advantageously inserted between at least two of said layers. This interface layer between the electrochromic layers and the insulating layers or the electrodes may be more or less gradual and may perform a buffer effect between the layers, in such a way that the tension due to thermal expansion, to ion insertion while the device is operating (which causes the interatomic distance to vary), or to the lack of adaptation between the crystalline (or nanocrystalline) network of the different materials in contact is reduced. This allows certain characteristics, such as for example the adherence of the layers to each other and to the substrate, to be improved.

Thus, the layer structure may be embodied with reduced thicknesses. It is, in particular, possible to make electrochromic devices according to the invention in which the thickness of the layer structure is less than 5 $\mu$m.

It is possible to add a passivating coating of a material selected from the group formed by $SiO_2$, polymeric siloxane, and mixtures thereof, to the electrochromic device. This allows the layer structure to be protected from the environment and, possibly, one of the glass supports to be dispensed with. This layer is preferably more than 1 $\mu$m thick.

The complementary electrochromic material habitually fulfils two functions: on the one hand, it has an ion storage function, and on the other hand, it adds its electrochromic effect to that of the other electrochromic layer. With nanostructured layers, it is possible to improve the efficacy of the electrochromic layer in such a way that a second layer of electrochromic material is no longer necessary. In these cases, it is possible to replace the layer of complementary electrochromic material with a layer of material which, while not having electrochromic properties, may act as an ion store. Examples of these materials are the transition metal oxides having low electrochromism in the visible range (chromium oxide, titanium oxide, manganese oxide, cerium oxide, among others) and which may reduce or increase their oxidation state with the insertion of alkali ions.

The electrochromic device of the invention is formed by a plurality of solid-state material layers. This advantageously allows non-planar electrochromic devices, i.e., in which the substrate is not flat, but has some type of curvature, to be made.

BRIEF DESCRIPTION OF THE DRAWING

Further advantages and features of the invention will become evident from the following description wherein there are related, without any limiting nature, preferred embodiments of the invention, with reference to the accompanying drawing, in which.

DETAILED DESCRIPTION OF PREFERRED EMBODIMENTS OF THE INVENTION

Figure 1:
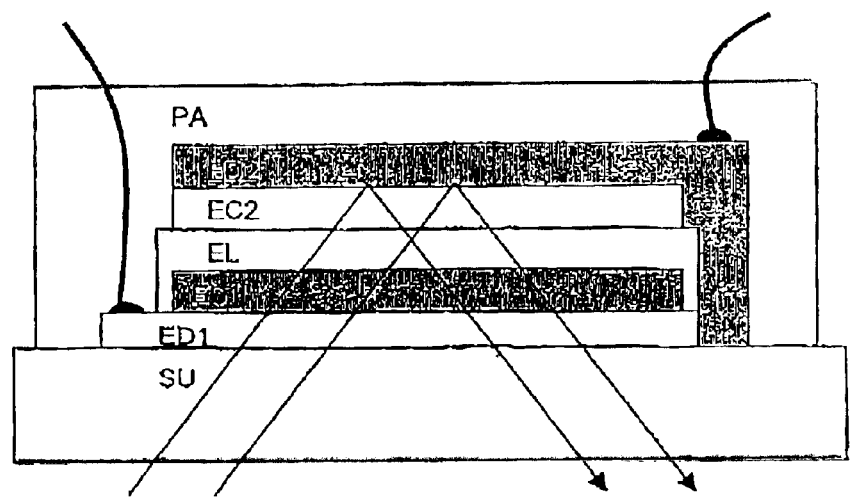
FIG. 1 is a schematic cross section view of an electrochromic device according to the invention.

The electrochromic device illustrated in FIG. 1 has a layered structure deposited in a glass substrate SU. The first layer contacting the glass substrate SU is a transparent electrode ED1. There then follows a first layer of electrochromic material EC1, a layer of electrolytic material EL, a second layer of electrochromic material EC2, and a second electrode ED2. The material of the second layer of electrochromic material EC2 is complementary to the material of the first layer of electrochromic material EC1, in such a way that when the ensemble is subjected to a potential difference, both layers EC1 and EC2 respond in the same direction.

The device is a mirror. Thus, the first electrode ED1 is transparent and the second electrode ED2 is reflective. The electromagnetic waves, in this case in the visible range, thus follow the path indicated by the arrows, in such a way that they pass through the substrate SU, the first electrode ED1, the first electrochromic layer EC1, the electrolyte EL, the second electrochromic layer EC2, until reflected back at the second electrode ED2 and returned through the remaining layers in the opposite direction.

It will be seen that the various layers of the device are not always completely overlapping. In particular, the electrodes ED1 and ED2 have a geometrical shape allowing the corresponding electrical contacts to be made. The layer of electrolytic material EL surrounds the first layer of electrochromic material EC1.

The device is also provided with a passivating layer PA which surrounds all the other layers and isolates them from the environment.

The manufacturing process for the nanostructured materials in thin layer on a substrate is based on: a) ionic sputtering of the surface of the growing material under a vacuum, using techniques based on the physical deposition in vapor phase (thermal evaporation or by electron gun, by DC cathodic spraying or RF magnetron cathodic spraying); or b) by deposition of nanometric particles generated in improved or plasma activated vapor phase chemical deposition processes (for example PECVD, PACVD) during the deposition of the layers to form nanometric particle systems embedded in a matrix of amorphous material; or, c) deposition of said multiple nanometric layers by said vapor phase physical deposition techniques, whereby the growth of the layers is stopped when the crystallites have reached a nanometric size (between 1 and 30 nm diameter) corresponding to layer thicknesses of nanometric order (below 100 nm).

Below there is described one example of deposition of an electrochromic window glass with a reactive evaporation system (RE) under high vacuum and using sputtering with argon and oxygen activated by an advanced plasma source (APS).

As a starting condition, it is necessary to have a degreased glass substrate free from dust particles, in work conditions corresponding to a class 100 clean room.

Optionally, a first prior deposition will be made in a high vacuum chamber of the chromium and copper electrical contacts, to have access to the electrically active parts of the structure.

Optionally, once the glass substrate has been installed, an ionic sputtering (with argon ions) may be performed within the vacuum chamber to remove any possible remains of impurities on the substrate.

A multilayer structure is deposited with a reactive evaporation (RE) system under high vacuum and sputtering with APS activated argon and oxygen. To this end, the following steps are followed:

a) layer of transparent conductive electrode, using $In_2O_3$:Sn (ITO), with an RE process.
   partial oxygen pressure: $10^{-3}$ mbar
   substrate temperature: 335° C.
   deposition rate: 0.08 nm/s
   material used: $In_2O_3$:$SnO_2$ tablets (density=7.22 g/cm$^3$) Balzers 99.5%, code BD481 869-T
   thickness of deposited layer according to (quartz crystals) XTM: 200 nm.

b) first layer of electrochromic material, using $V_2O_5$, with an RE process.
   partial oxygen pressure: $5\times10^{-4}$ mbar
   substrate temperature: 250° C.
   deposition rate: 0.1 nm/s
   material used: powdered $V_2O_5$ (density=3.36 g/cm$^3$) Alpha 99.2%, code 81110
   thickness of deposited layer according to XTM: 200 nm.

c) layer of ion-conductive dielectric material, using $Ta_2O_5$, with an RE process.
   partial oxygen pressure: $5\times10^{-4}$ mbar
   substrate temperature: 200° C.
   deposition rate: 0.2 nm/s
   material used: powdered $Ta^2O^5$ (density=8.2 g/cm$^3$) Alpha 99%, code 73104
   thickness of deposited layer according to XTM: 450 nm.

d) second layer of electrochromic material, $WO_3$. This layer is nanostructured, with 15 nanolayers. These nanolayers are deposited under two different conditions (1 and 2) and alternate with each other, such that the nanostructured layer has the following arrangement of nanolayers: 1/2/1/2/1/2/1/2/1/2 ... /1. Each nanolayer is 10 nm thick and the total thickness of the nanostructured layer, according to XTM, is 150 nm. The nanolayers 1 and 2 are deposited under the following conditions:

Nanolayer 1: layer of $WO_3$, with an RE process.
   partial oxygen pressure: $5\times10^{-4}$ mbar
   substrate temperature: 150° C.
   deposition rate: 0.1 nm/s
   material used: powdered $WO_3$ (density=7.16 g/cm$^3$) Alpha 99%, code 82120
   thickness of deposited layer according to XTM: 10 nm.

Nanolayer 2: a layer of $WO_3$ deposited under the same conditions as described for nanolayer 1 (with RE process) and with sputtering with argon ions and oxygen atoms by APS.

The result is a nanostructured layer having interfaces distributed in depth within the $WO_3$ layer which lead to an increase in the structural defects and of the ion exchange associated with the electrochromic effect.

e) insertion of alkali ions

In this step of the deposition process, alkali ions (H, Li, K, Na, . . . ) are inserted outside the vacuum chamber by conventional liquid phase electrochemical methods.

f) rear reflective electrode of Al material, with an RE process.
   partial oxygen pressure: absence of oxygen ($7\times10^{-6}$ mbar residual vacuum)
   substrate temperature: 25° C.
   deposition rate: 20 nm/s
   material used: Al rod (density=2.76 g/cm$^3$) Balzers 99.99%, code BD 481 003-T
   thickness of deposited layer according to XTM: 150 nm.

g) Protective passivating layer, deposited by an RE process and APS sputtering.

A protective layer against external agents is deposited over the entire above structure. This layer may be, for example, SiOx, deposited from tetramethyl disiloxane (TMDS). The thickness of this layer will be less than 15 $\mu$m.

There are described hereinafter a number of examples of electrochromic devices made substantially with the same steps a) to c) and e) to g), modifying only step d), i.e., modifying the deposition conditions of the nanostructured layer of electrochromic material.

Three examples (Examples B, C and D) of $WO_3$ nanostructured layer deposited by RF sputtering magnetron and with a surface treatment using ion sputtering with oxygen were made. Table 1 lists the deposition conditions of each example, and the case of a standard $WO_3$ layer deposited by RF sputtering magnetron (Example A) has been included.

It should be borne in mind that the multilayer structure places barriers to the passage of the ions towards the inner layers, which compensates in part for the defects introduced by the nanostructure. It is, therefore, of interest that the multilayer structure should not be too defined, so as not to negatively affect the ionic conductivity.

Table 2 contains the values of the following characteristics:

The Optical Density variation, $\Delta OD$, for a wavelength $\lambda=700$ nm:

$$\Delta OD = \log\left(\frac{T_{max}}{T_{min}}\right)$$

the transferred load, $\Delta Q$. This load has been determined by Cyclic Voltametry, with cycles defined between $-0.8V$ and $+0.4V$ and with a ramp of 10 mV/s. $\Delta Q$ is indicative of the ionic diffusion and/or conductivity of the $WO_3$ layer.

the Coloring Efficiency, $\eta$ $$\eta = \frac{\Delta OD}{\Delta Q}$$

The characteristic R is used in Table 2. This is the gas flow ratio defined by the expression:

$$R = \frac{[O_2]}{[Ar]}$$

The gas flow is measured in standard cubic centimeters per minute (sccm).

The nanostructured multilayer system consists of 10 or 15 paired layers, each consisting of two nanolayers deposited under two different conditions (1 and 2) alternating with each other, so that the nanostructured layer has the following arrangement of nanolayers: 1/2/1/2/1/2/1/2/1/2 . . . /1. Each nanolayer has a thickness ranging from 3 to 12 nm (see values for each multilayer system in Table 1), and the total thickness of the nanostructured multilayer system ranges between 150 and 217 nm (Table 1).

Deposition with RF sputtering magnetron was carried out in a vacuum chamber from a 99.5% pure W metal target having a diameter of 3 inches. The gap between the target and the substrate was 67 mm and the target was sputtered with a gaseous mixture of Ar and $O_2$ with particular ratios, $R=[O2]/[Ar]$ (see Table 2 for values) The pressures used during deposition with the RF sputtering magnetron varied according to the sample Example between 0.27 and 0.98 Pa (see Table 1). The RF power was 30 W in all the RF sputtering magnetron deposition processes. The deposition processes were carried out at room temperature (around 30° C.) on glass substrates on which there had been previously deposited a transparent conductive ITO electrode layer about 300 nm thick and with resistance values per square of about 10 to 40$\Omega$/, deposited under the conditions given in step a) of the electrochromic window glass example with a reactive evaporation (RE) system. Table 1 summarizes the different deposition conditions.

TABLE 1

| | Nanolayers | Deposition Conditions | |
|---|---|---|---|
| A | Standard non-structured single layer of $WO_3$ | RF Sputtering magnetron: Pressure: 0.83 Pa RF Power: 30 W Gas flow ratio: R = 10/10 | |
| | Total thickness: 150 nm | Deposition time: 1 hour Thickness: 150 nm | |
| B | | Layer 1, $WO_3(+45°)$: | Layer 2, $WO_3(-45°)$: |
| | 15 nanostructured paired layers of $WO_3(+45°)/WO_3(-45°)$ | RF sputtering magnetron Substrate sloping at +45° Pressure: 0.86 Pa RF Power: 30 W Gas flow ratio: R = 20/20 Deposition time: 2 min | RF sputtering magnetron Substrate sloping at -45° Pressure: 0.86 Pa RF Power: 30 W Gas flow ratio: R = 20/20 Deposition time: 2 min |
| | Thickness total: 217 nm | Thickness: 7 nm | Thickness: 7 nm |
| C | | Layer 1, $WO_3$ (high): | Layer 2, ionic sputtering |
| | 15 nanostructured | RF sputtering magnetron | with oxygen: |
| | paired layers of $WO_3$(high)/ion gun (30 s) | Pressure (high): 0.92 Pa RF Power: 30 W Gas flow ratio: R = 21/21 Deposition time: 4 min | Ion gun Pressure: 0.03 Pa RF Power: 50 W Gas flow: $[O_2]$ = 1 sccm Deposition time: 30 s |
| | Thickness total: 150 nm | Thickness: 10 nm | Screen-Grid: 400 V, Accelerator Grid: 40 V |
| D | | Layer 1, $WO_3$(high): | Layer 2, ionic sputtering |
| | 15 nanostructured | RF sputtering magnetron | with oxygen: |
| | paired layers of $WO_3$(high)/ion gun (10 s) | Pressure (high): 0.98 Pa RF Power: 30 W Gas flow ratio: R = 21/21 Deposition time: 4 min | Ion gun Pressure: 0.04 Pa RF Power: 50 W Gas flow: $[O_2]$ = 1 sccm Deposition time: 10 s |
| | Thickness total: 150 nm | Thickness: 10 nm | Screen-Grid: 300 V Accelerator Grid: 25 V |

The results are nanostructured multilayer systems having interfaces distributed at depth within the $WO_3$ layer which lead to an increase in the structural defects and of the ion exchange associated with the electrochromic effect.

The results of the measurements, summarized in Table 2, show:

1. The variation of the optical density $\Delta OD$ of the nanostructured systems C and D (sputtering-ion gun) has increased by 2.4% and 13.3% respectively, when compared with the value of the standard non-nanostructured layer A of $WO_3$. This increase leads to a deeper coloring of the nanostructured systems C and D in comparison with layer A of standard material.
2. The load $\Delta Q$ transferred by the nanostructured system B ($WO_3(+45'I)/WO_3(-45°)$) has increased by 3.9% relative to the value of the standard non-nanostructured layer A of $WO_3$. On the other hand, the load $\Delta Q$ transferred by the nanostructured systems C and D (sputtering-ion gun) has increased by 12.3% and 14.0% respectively in comparison with the value of the standard non-nanostructured layer A of $WO_3$. This result indicates the increase in diffusion and, therefore, of the ionic conductivity of three of the nanostructured systems (B, C and D) relative to the standard layer A of $WO_3$. This result leads to an increase in the rate of response of those nanostructured systems (B, C and D) in comparison with the layer A of standard material.
3. System D shows a reduction of −1.3% in the coloring efficiency $\eta$ determined for $\lambda=700$ nm, relative to the value of the standard non-nanostructured layer A of $WO_3$. Nevertheless, this value is within the margin of error of the calculations of the efficiencies, whereby it may be said that the coloring efficiency values of the standard material are maintained in system D.

TABLE 2

| | standard $\Delta OD$ (%) (error ± 1%) | standard $\Delta Q$ (%) (error ± 2%) | standard $\eta$ ($\lambda$ = 700 nm) (%) (error ± 3%) |
|---|---|---|---|
| A | 100% | 100% | 100% |
| B | 85.5% | 103.9% | 81.4% |
| C | 102.4% | 112.3% | 90.3% |
| D | 113.3% | 114.0% | 98.6% |

With regard to the above-referenced layer of electronic insulating transparent ion-conducting solid electrolytic material, production and characterization of nanostructured layers of silicon carbide in the form of an amorphous thin film with embedded nanoparticles can be performed as follows.

Experimental Details

Thin films of ns-SiC were produced by PECVD in a vacuum reactor using a continuous-wave rf power signal (13.56 MHz) of 25 W. The precursor compound consisted of a gas mixture of $SiH_4$, $CH_4$ and Ar, introduced into the reactor by independent gas lines. The experiments were carried out at room temperature and used different relative concentrations of $SiH_4$ and $CH_4$ diluted in Ar. They were parameterised by the volumetric ratios R and 0, defined at standard conditions and given by:

$$R = \frac{[SiH_4]}{[SiH_4]+[CH_4]} \quad Q = \frac{[SiH_4]+[CH_4]}{[Ar]} \quad (1)$$

The ratio studied ranged from 0.05 to 0.2 for R and from 0.1 to 0.2 for Q. Other deposition parameters were the processing pressure, ranging from 20 to 33 Pa, and the rf power ranging from 25 to 50 W. The technological parameters and deposition rate of the samples are listed in Table 3. The plasma deposition conditions of the films were tuned after each run of the ns-SiC:H layers. In this process, the system was previously pumped up to $4\times10^{-3}$ Pa, and then an Ar flow rate was introduced to keep 30 Pa in the chamber. To adapt the plasma impedance, a discharge of pure Ar and 30 W of incident rf power was used to record the matching network configuration.

For different purposes, the samples were deposited on different substrates (glass, aluminium-coated glass, crystalline silicon wafers and $WO_3$/ITO/glass) held on the anode. The plasma box consisted of two large parallel electrodes, spaced at 40 mm. Additionally, other series of substrates were placed on the cathode, in order to record any difference in the deposited films.

FTIR measurements were performed under vacuum with a Bomen DA3 FTIR-spectrometer and using a silicon wafer polished on both sides as reference. Both selected area electron diffraction (SAED) and transmission electron microscope (TEM) micrographs were obtained using a Phillips-CM30 TEM. Film thicknesses were measured by a Dektak 3030 profilometer. Ionic conductivity in the form of cyclic voltammetries was measured by an experimental electrochemical cell consisting of a $H_3PO_4$ 0.1 M liquid solution along with a voltage source and an amperemeter to register current intensity. Finally, an HP-4192A impedance analyser measured the dielectric function of the samples using an Al/SiC/Al parallel capacitor configuration.

Results a) Growth Kinetics:

The deposition rate of the ns-SiC films grown under various plasma conditions (Table 3) was determined and compared with the technological parameters, rf power, ratio R and pressure. The data analysis indicates that, in the range studied, the deposition rate depends on R and pressure but is independent of rf power.

b) Nanoparticle Formation:

The formation of nanometric particles was demonstrated by measurements of light scattering at 90° of the focused NdYAg laser beam working at 532 nm wavelength. The scattered light coming from the particles confined by the plasma sheath indicated the plasma conditions for the formation of particles. Scattered light signal appears when the particles reach sizes greater than 10–20 nm. Then, in order to have particles under 10 nm, we set the plasma under conditions just before the detection of the scattered light. Particles smaller than 5 nm are mainly not confined by the plasma sheath because of their neutral or positively charged condition. Under suitable CW plasma conditions (see Table 3), particles of sizes lower than 5 nm can be incorporated into the growing film. The control by Mie scattering of particle formation provides a reproducible method of obtaining SiC films with nanometric particles of controlled size embedded in an amorphous matrix in a considerable range of deposition conditions (Table 3).

c) Electrical Properties:

Dielectric response was measured in ns-SiC films, using a capacitive structure with Al electrodes of 6 $mm^2$ area. According to the results of FTIR analysis, the structure of the ns-SiC films containing nanometric crystalline particles has microcavities with Si<$H_2$ bonds, which facilitate the diffusion of ions through the film. Voltammetric measurements in an ns-SiC/$WO_3$/ITO/glass multilayer structure provided evidence of ion transport through the ns-SiC layers. The electrical characteristics of the ns-SiC analyzed ensure the absence of electronic DC current leakage. In addition, the optical measurements indicate a transmittance in the visible range of 90% for the multilayer structure during the bleaching state before the introduction of H$^+$ ions. The transference of ionic charge through the ns-SiC layer can be evaluated by the variation of the optical transmittance of the multilayer structure between the bleached and dark states. Samples grown at R=0.15 show a variation of transmittance from 92% to 87%, whereas for R=0.075 the variation was from 90% to 65%, after three voltammetric cycles. The higher ionic conductivity of samples grown at lower ratio is probably due to lower electron leakage, which is in line with the dielectric frequency response measurements.

Therefore nanostructured silicon carbide films can be produced at room temperature by PECVD. The control of particle formation by Mie scattering provides a reproducible method for producing nanostructured SiC films. HRTEM and electron diffraction analysis reveal a nanostructure of the films, consisting of SiC with crystalline nanometric spherical particles (2–3 nm in diameter) embedded in an amorphous silicon carbide matrix. The singular characteristics of this material's transparency and dielectric, ion-conductor and ceramic general properties make it suitable for uses involving ion transport, such as optical, dielectric and sensor devices under adverse conditions of wear, temperature and chemical activity. It has mechanical, high-temperature and corrosion-resistant properties.

TABLE 3

Technological parameters of PECVD process and deposition rate of ns-SiC thin films

| P (Pa) | Rf Power (W) | R | Q | Rate (nm/s) | Comments |
|---|---|---|---|---|---|
| 20.6 ± 0.25 | 50 | 0.1 | 0.1 | | |
| 20.60 ± 0.4 | 25 | 0.1 | 0.1 | | |
| 20.4 ± 0.2 | 50 | 0.2 | 0.1 | 0.20 ± 0.03 | |
| 30.65 ± 1.35 | 50 | 0.2 | 0.1 | | |
| 30.65 ± 1.35 | 25 | 0.2 | 0.1 | 0.305 ± 0.01 | |
| 32.93 ± 3.07 | 25 | 0.2 | 0.1 | 0.33 ± 0.05 | |
| 31.86 ± 1.46 | 25 | 0.1 | 0.1 | 0.203 ± 0.014 | |
| 20.53 ± 0.27 | 25 | 0.2 | 0.1 | 0.169 ± 0.004 | Poor adherence |
| 28.5 ± 0.5 | 50 | 0.1 | 0.1 | 0.171 ± 0.01 | Very low adherence |
| 20.4 ± 0.4 | 50 | 0.2 | 0.1 | 0.26 ± 0.03 | |
| 25.33 ± 0.26 | 37.5 | 0.15 | 0.1 | 0.186 ± 0.03 | |
| 20.4 ± 0.4 | 50 | 0.2 | 0.1 | 0.170 ± 0.007 | |
| 31.6 ± 0.4 | 25 | 0.05 | 0.1 | 0.1025 ± 0.0025 | |
| 31 ± 1 | 25 | 0.075 | 0.1 | 0.17 ± 0.003 | |
| 29 ± 1 | 25 | 0.05 | 0.1 | 0.08 | |
| 30 ± 2 | 25 | 0.15 | 0.1 | 0.28 | |

What is claimed is:

1. An electrochromic device of the type comprising at least one substrate and a structure of at least partly superimposed layers, where said structure comprises at least one layer of electrochromic material and a layer of electronic insulating transparent ion-conducting solid electrolytic material, where at least one of said layers of electrochromic material is nanostructured, i.e. has a nanostructure, and is, in turn, formed by a plurality of nanolayers, characterized in that said nanolayers forming one of said nanostructured layers are of the same material but deposited under different conditions.

2. The electrochromic device as defined in claim 1, wherein said electrochromic material is a material selected from the group formed by wolfram oxide, molybdenum oxide, vanadium oxide, titanium oxide, chromium oxide, iridium oxide, niobium oxide and combinations of at least two of these.

3. The electrochromic device as defined in claim 1, wherein said superimposed layer structure comprises a first layer which is an electrode, said electrode being a conductive metal or a transparent conductive oxide, a second layer which is an electrochromic material, a third layer which is an electronic insulating transparent ion-conducting solid electrolytic material, a fourth layer which is also an electrochromic material, with the electrochromic material of said fourth layer being complementary to the electrochromic material of said second layer, a fifth layer which is an electrode, said electrode being a conductive metal or a transparent conductive oxide.

4. The electrochromic device as defined in claim 1, wherein said structure of at least partly superimposed layers comprises a first layer which is an electrode, said electrode being a conductive metal or a transparent conductive oxide, a second layer which is an electrochromic material, a third layer which is an electronic insulating transparent ion-conducting solid electrolytic material, and a fourth layer which is an electrode, said electrode being a conductive metal or a transparent conductive oxide.

5. The electrochromic device as defined in any one of claims 1–4, wherein each of said nanolayers has a thickness ranging from 2 to 20 nm.

6. The electrochromic device as defined in at least one of claims 1–4, wherein each of said nanostructured layers has a thickness ranging from 100 to 400 nm.

7. The electrochromic device as defined in at least one of claims 1–4, wherein between at least two of said layers there is situated an interface layer having a thickness ranging from 0.5 to 10 nm.

8. The electrochromic device as defined in any one of claims 1–4, including a layer of a material suitable for storing ions.

9. The electrochromic device as defined in claim 8, wherein said material suitable for storing ions is a material selected from the group formed by chromium oxide, titanium oxide, manganese oxide and cerium oxide.

10. An electrochromic device of the type comprising at least one substrate and a structure of at least partly superimposed layers, where said structure comprises at least one layer of electrochromic material and a layer of electronic insulating transparent ion-conducting solid electrolytic material, where at least one of said layers of electrochromic material is nanostructured, i.e. has a nanostructure, characterized in that said layer of electronic insulating transparent ion-conducting solid electrolytic material is nanostructured, i.e. has a nanostructure.

11. The electrochromic device as defined in claim 10, wherein said layer of electronic insulating transparent ion-conducting solid electrolytic material is an electronic insulating material having a resistivity above $10^9$ Ω·m and having an extinction coefficient $k<10^{-2}$ in the visible range (400 nm to 800 nm).

12. The electrochromic device as defined in claim 11, wherein said layer of electronic insulating transparent ion-conducting solid electrolytic material is a material selected from the group formed by the binary compounds $SiO_2$, $SiO$, $SiC$, $Ta_2O_5$, $Al_2O_3$, $Si_3N_4$, $Y_2O_3$, $MgF_2$, $Zr_3O_2$, the ternary compounds $LiAlF_4$, $LiNbO_5$ and combinations of at least any two of the foregoing compounds.

13. The electrochromic device as defined in claim 10, wherein said nanostructured layer is, in turn, formed by a plurality of nanolayers.

14. The electrochromic device as defined in claim 13, wherein said nanolayers forming one of said nanostructured layers are of different materials.

15. The electrochromic device as defined in claim 13, wherein said nanolayers forming one of said nanostructured layers are of the same material but deposited under different conditions.

16. The electrochromic device as defined in any one of claims 14–15, wherein each of said nanolayers has a thickness ranging from 2 to 20 nm.

17. The electrochromic device as defined in any one of claims 14–15, wherein each of said nanostructured layers has a thickness ranging from 100 to 400 nm.

18. The electrochromic device as defined in any one of claims 1–4, 8, or 10–15 comprising a passivating coating of a material selected from the group consisting of $SiO_2$, polymeric siloxane, and mixtures of both compounds, said passivating coating having a thickness of more than 1 $\mu$m.

* * * * *